(12) United States Patent
Watanabe et al.

(10) Patent No.: US 8,763,048 B2
(45) Date of Patent: Jun. 24, 2014

(54) DIGITAL BROADCAST RECEIVER AND RECEPTION METHOD

(75) Inventors: Ryuhsuke Watanabe, Osaka (JP); Toshinori Shimizu, Osaka (JP); Hajime Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 188 days.

(21) Appl. No.: 13/122,764

(22) PCT Filed: Oct. 5, 2009

(86) PCT No.: PCT/JP2009/067347
§ 371 (c)(1),
(2), (4) Date: Apr. 6, 2011

(87) PCT Pub. No.: WO2010/041628
PCT Pub. Date: Apr. 15, 2010

(65) Prior Publication Data
US 2011/0197245 A1    Aug. 11, 2011

(30) Foreign Application Priority Data
Oct. 7, 2008 (JP) ................................. 2008-260738

(51) Int. Cl.
*H04N 7/025* (2006.01)
*H04N 7/173* (2011.01)
*H04N 21/434* (2011.01)
*H04N 21/443* (2011.01)
*H04N 21/643* (2011.01)
*H04N 21/462* (2011.01)

(52) U.S. Cl.
CPC ...... *H04N 21/4345* (2013.01); *H04N 21/64322* (2013.01); *H04N 21/4432* (2013.01); *H04N 21/4622* (2013.01)
USPC .......................................... 725/54; 725/110

(58) Field of Classification Search
CPC ............ H04N 21/2381; H04N 21/238; H04N 21/434; H04N 21/643; H04N 21/64322; H04N 21/4345; H04N 21/6106; H04N 21/6125; H04N 21/438; H04N 21/4432; H04N 21/462; H04N 21/4622
USPC .............................. 725/50, 54, 105, 110, 132
See application file for complete search history.

(56) References Cited

U.S. PATENT DOCUMENTS

| | | | |
|---|---|---|---|
| 7,581,110 B1* | 8/2009 | Probasco | 713/181 |
| 8,112,775 B2* | 2/2012 | Lee et al. | 725/50 |
| 8,234,673 B2* | 7/2012 | Kinoshita et al. | 725/51 |
| 8,397,256 B2* | 3/2013 | Lee et al. | 725/38 |
| 8,424,050 B2* | 4/2013 | Ohmae | 725/110 |
| 8,484,689 B2* | 7/2013 | Lee et al. | 725/105 |
| 8,635,641 B2* | 1/2014 | Lee et al. | 725/28 |
| 2004/0123313 A1* | 6/2004 | Koo et al. | 725/31 |
| 2004/0172326 A1* | 9/2004 | Yeo et al. | 705/14 |
| 2005/0195862 A1* | 9/2005 | Jones et al. | 370/503 |
| 2006/0184964 A1* | 8/2006 | Kim et al. | 725/39 |
| 2006/0233132 A1* | 10/2006 | Lee | 370/328 |
| 2007/0104181 A1* | 5/2007 | Lee et al. | 370/352 |
| 2007/0118614 A1* | 5/2007 | Bertin | 709/219 |
| 2007/0121940 A1* | 5/2007 | Park et al. | 380/201 |
| 2007/0224971 A1* | 9/2007 | Jung et al. | 455/411 |
| 2008/0031451 A1* | 2/2008 | Poirier | 380/228 |
| 2008/0040744 A1* | 2/2008 | Sukuki | 725/39 |
| 2008/0083004 A1* | 4/2008 | Kim et al. | 725/114 |
| 2008/0092184 A1* | 4/2008 | Kim et al. | 725/110 |
| 2008/0092185 A1* | 4/2008 | Kim et al. | 725/110 |
| 2008/0127265 A1* | 5/2008 | Ward et al. | 725/42 |
| 2008/0155612 A1* | 6/2008 | Ikeda et al. | 725/87 |
| 2008/0168486 A1* | 7/2008 | Song et al. | 725/28 |
| 2008/0172701 A1 | 7/2008 | Hong et al. | |
| 2008/0216110 A1* | 9/2008 | Song et al. | 725/25 |
| 2009/0100470 A1* | 4/2009 | Yai et al. | 725/46 |
| 2009/0144783 A1* | 6/2009 | Lee et al. | 725/93 |
| 2009/0144790 A1* | 6/2009 | Lee et al. | 725/110 |
| 2009/0150933 A1* | 6/2009 | Lee et al. | 725/40 |
| 2009/0158327 A1* | 6/2009 | Song et al. | 725/38 |
| 2009/0158330 A1* | 6/2009 | Song et al. | 725/39 |
| 2009/0158348 A1* | 6/2009 | Song et al. | 725/54 |
| 2009/0158349 A1* | 6/2009 | Song et al. | 725/54 |
| 2009/0165050 A1* | 6/2009 | Lee et al. | 725/39 |
| 2009/0183206 A1* | 7/2009 | Lee et al. | 725/56 |
| 2009/0187960 A1* | 7/2009 | Lee et al. | 725/131 |
| 2009/0193469 A1* | 7/2009 | Igarashi | 725/56 |

| | | | | |
|---|---|---|---|---|
| 2009/0204986 A1* | 8/2009 | Lee et al. | | 725/27 |
| 2009/0300164 A1* | 12/2009 | Boggs et al. | | 709/224 |
| 2010/0186044 A1* | 7/2010 | Yang et al. | | 725/50 |
| 2010/0195828 A1* | 8/2010 | Hong et al. | | 380/255 |
| 2010/0228844 A1* | 9/2010 | Jung et al. | | 709/223 |
| 2010/0251315 A1* | 9/2010 | Ohmae | | 725/110 |
| 2011/0197244 A1* | 8/2011 | Shimizu et al. | | 725/110 |
| 2011/0197245 A1* | 8/2011 | Watanabe et al. | | 725/110 |
| 2011/0202642 A1* | 8/2011 | Shimizu | | 709/221 |
| 2012/0023067 A1* | 1/2012 | Clegg et al. | | 707/634 |
| 2012/0173648 A1* | 7/2012 | Kunz et al. | | 709/206 |
| 2014/0006951 A1* | 1/2014 | Hunter | | 715/719 |

FOREIGN PATENT DOCUMENTS

| | | |
|---|---|---|
| JP | 2004-241994 A | 8/2004 |
| JP | 2007-329701 A | 12/2007 |
| JP | 2008-53975 A | 3/2008 |
| JP | 2008-125033 A | 5/2008 |

OTHER PUBLICATIONS

WG1 Chair, "WG 1 Living List (Architecture)," International Telecommunications Union, Telecommunications Standardization Sector, Focus Group on IPTV, FG IPTV-OD-0030, Geneva, Jul. 10-14, 2006, pp. 1 and 26-28.

* cited by examiner

*Primary Examiner* — James R Sheleheda
(74) *Attorney, Agent, or Firm* — Birch, Stewart, Kolasch & Birch, LLP

(57) ABSTRACT

If there is a service provider for which basic registration has already been performed, the processing proceeds to step S15 to determine whether there is an IP broadcast service or not. If no IP broadcast service is provided, the processing proceeds to step S17 to determine whether there is another service provider for which the basic registration has already been performed. If no other service provider for which the basic registration has already been performed is found in this determination, a transition is made to a portal site of the service provider for which the basic registration has already been performed. If it is determined that an IP broadcast service is provided in step S15, the processing proceeds to step S16 to perform a caution display. In the caution display, a display is made to prompt acquisition of channel information. In the case of acquiring channel information, an indication informing the user is displayed so that the channel information can be acquired at this phase. Thereby, when IP broadcasting is selected, the receiver determines whether there is a broadcast viewable with the receiver and changes a screen after transition, thus enabling the user to perform an operation without any confusion.

9 Claims, 5 Drawing Sheets

Acquisition of channel information (continued from S2)

(a) When one or more channels are found (b) When no channel is found

DIGITAL BROADCAST RECEIVER AND RECEPTION METHOD

TECHNICAL FIELD

The present invention relates to a digital broadcast reception technique and particularly relates to a digital broadcast receiver including an IPTV function.

BACKGROUND ART

Many of digital broadcast receivers are multi-functional devices having a lot of functions. Further, devices including the IPTV function have been getting available recently. The more functions the devices have, the more frequently screen transition occurs. This makes it more difficult for the user to smoothly perform his/her operation.

The technique described in Patent Literature 1 below discloses a device capable of allowing the user to know that channels receivable by a tuner include a channel which cannot be normally received when such channel is present.
Patent Literature 1: JP-A 2008-53975

DISCLOSURE OF THE INVENTION

Problems to be Solved by the Invention

In recent years, in addition to digital broadcast programs, various services such as IPTV services including IP broadcasting via the Internet and VOD have been becoming available by using digital broadcast receivers. A wider variety of broadcast services are provided and IPTV services and other services are viewed through the broadcast receivers, as described above. To this end, viewers need to enter detailed information and perform new setting operations for information such as which service providers the viewers subscribe to and whether the service providers distribute broadcasts, for example, in addition to entry of viewers' residence information which has been required. Accordingly, there are a problem that the viewers have large load, and another problem that the viewers cannot easily receive expanded services.

An object of the present invention is to, when IP broadcasting is selected, enable operations without any confusion by determining whether there is a broadcast viewable with a receiver and changing a screen after transition.

Means for Solving the Problems

According to the present invention, the broadcast receiver previously makes determinations based on whether the viewer has a subscription and whether there is a viewable broadcast. Accordingly, the screen after transition can be changed according to the state of the viewer's subscription and a service provided by a service provider.

An aspect of the present invention provides a digital broadcast receiver capable of receiving an IP broadcast, characterized by including: a controller configured to perform, at initial startup, control such that, among settings concerning an IPTV function, a process to set an IP address and DNS, a process to acquire CDN configuration information, and a process to acquire PF configuration information are performed while a process to acquire channel information is not performed.

Some of providers providing services require previous online basic registration. To actually use IP broadcast services, it is necessary to acquire channel information. However, the channel information is not acquired at initial setting for IPTV because 1) the previous basic registration is required at a portal site in some cases and 2) IP broadcast services are not provided in some service types. Note that, the basic registration refers to a process to notify the service provider of user's information to activate a service. When a certain period of time elapses after the activation, channel setting becomes available.

The controller preferably performs a caution display to prompt the process to acquire the channel information when there is a service provider for which basic registration has already been performed. Even if a service provider for which the basic registration has already been performed exists but does not provide an IP broadcast service; but if there is another service provider for which the basic registration has already been performed, the controller may determine whether there is an IP broadcast service again.

If a service provider for which the basic registration has already been performed exists but does not provide an IP broadcast service; and if there is no other service provider for which the basic registration has already been performed, the controller preferably transitions to a portal site set in the basic registration. The controller preferably transitions to a portal site when there is no service provider for which the basic registration has already been performed.

Another aspect of the present invention provides a reception method in a digital broadcast receiver capable of receiving an IP broadcast, characterized by including performing, at initial startup, a process step of setting an IP address and DNS, a process step of acquiring CDN configuration information, and a process step of acquiring PF configuration information, while skipping a process step of acquiring channel information, among settings concerning an IPTV function.

The present invention may be a program causing a computer to execute the above method, or otherwise, may be a computer-readable recording medium on which the program is recorded. The program may be acquired via a transmission medium such as the Internet.

This specification includes the contents of the specification and/or drawings of Japanese Patent Application No. 2008-260738 which is the basis of priority of the subject application.

Effect of the Invention

According to the present invention, when the viewer selects an IP broadcast, the receiver determines whether there is a broadcast viewable with the receiver and changes the screen after transition. This allows the viewer to perform an operation without any confusion in enormous number of services.

EXPLANATION OF REFERENCE NUMERALS

A . . . DIGITAL BROADCAST RECEIVER
1 . . . FRONT-END

3 ... DEMULTIPLEXER
5 ... VIDEO/AUDIO DECODER
7 ... AUDIO OUTPUT SECTION
11 ... PROGRAM INFORMATION DECODING SECTION
17 ... SCREEN SYNTHESIS SECTION
21 ... DISPLAY SECTION
25 ... CONTROLLER
28 ... INTERFACE SECTION
NT ... INTERNET
B ... CONTENT SERVER

BEST MODE FOR CARRYING OUT THE INVENTION

First, basic terms are defined below before description about an embodiment of the present invention.

1) CDN (contents delivery network): A network designed to deliver digital contents.

2) CDN configuration information: Information for acquiring time information and a URL for acquiring PF configuration information are included.

3) PF configuration information: Presence or absence of provision of IP broadcast services, information for acquiring channel information, and information on a service provider included in itself (portal URL and the like) are included. A URL for acquiring the PF configuration information is described in the CDN configuration information.

4) IPTV service: A collective term for IP broadcast, portal, and VOD services and the like.

Figure 1:
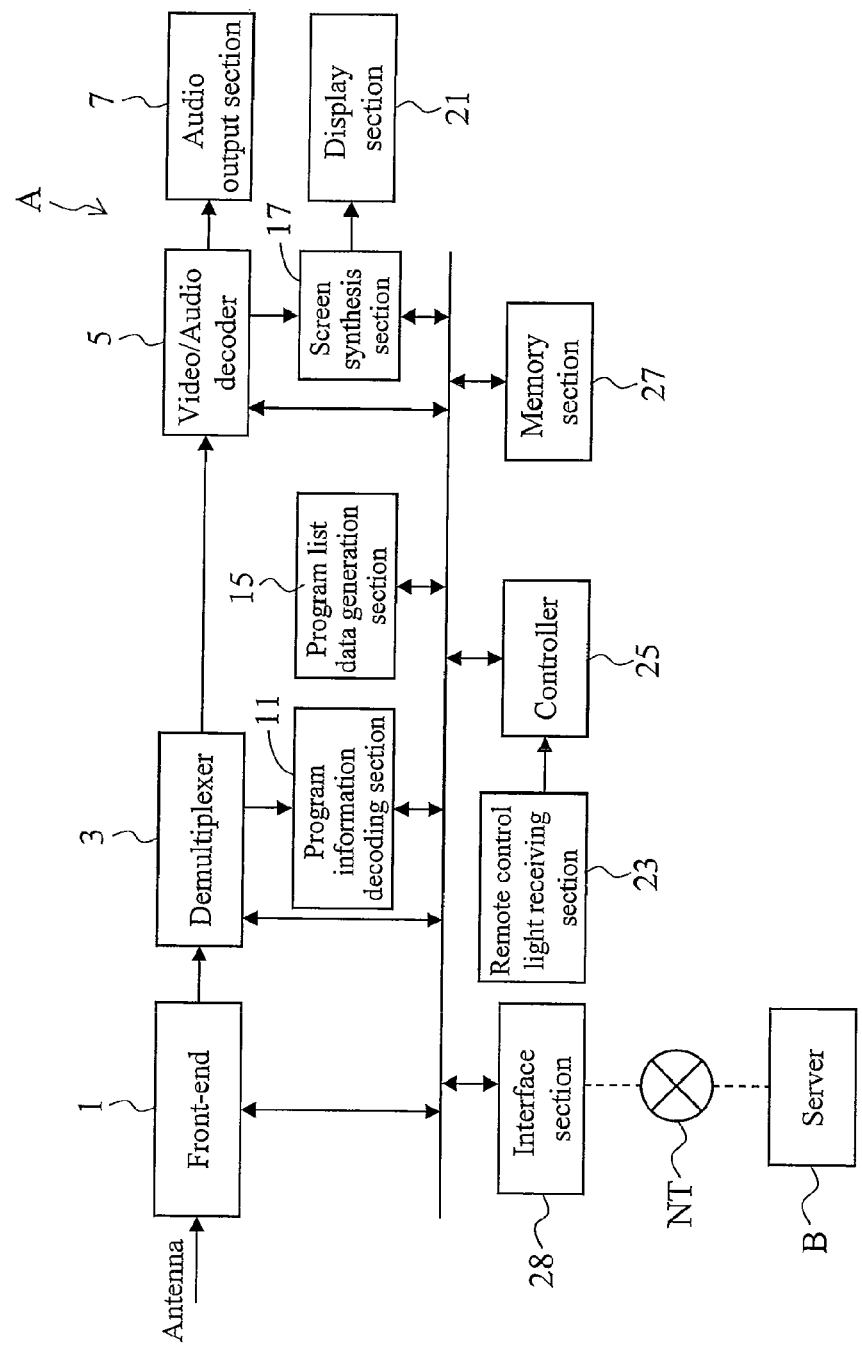
FIG. 1 is a diagram showing a configuration example of a digital broadcast receiver according to an embodiment of the present invention.

Hereinafter, a digital broadcast reception technique according to an embodiment of the present invention will be described with reference to the drawings. FIG. 1 is a diagram showing a configuration example of a digital broadcast receiver according to an embodiment of the present invention. A digital broadcast receiver A shown in FIG. 1 includes: a front-end 1 configured to perform processes to receive signals of digital broadcasts through an antenna and tune channels; a demultiplexer 3; a video/audio decoder 5 configured to decode an output from the demultiplexer 3; a screen synthesis section 17 configured to synthesize the decoded video signal and later-described program list data to generate a signal for display; a display section 21 for display based on the signal synthesized in the screen synthesis section 17; and an audio output section 7 configured to output audio.

The digital broadcast receiver A further includes: a program information decoding section 11 configured to decode program information outputted from the demultiplexer 3; and an electronic program list generation section 15 configured to generate an electronic program list based on the program information decoded by the program information decoding section 11.

In addition, the digital broadcast receiver A includes: an interface section 28 forming an interface between the receiver A and another external device; a remote control light receiving section 23 configured to receive remote control signals from a remote control unit as a control device; a controller (CPU) 25 configured to control the entire device; and a memory section (RAM, ROM) 27 configured to store an application program executed by the controller 25 for various processes and to expand and provide the program to the CPU. The interface section 28 is capable of receiving digital contents delivered from a content server B through the Internet (NT). The controller 25 also performs control concerning channel tuning at the time of selecting IPTV.

In order for a broadcast receiver capable of receiving IPTV to receive an IP broadcast, the broadcast receiver needs to set an IP address and DNS and acquire the CDN configuration information, PF configuration information, and channel information. Some of the providers providing services previously require online basic registration. Here, the basic registration refers to a process to notify a service provider of user's information to activate a service. When a certain period of time elapses after the activation, channel setting becomes available.

Figure 2:
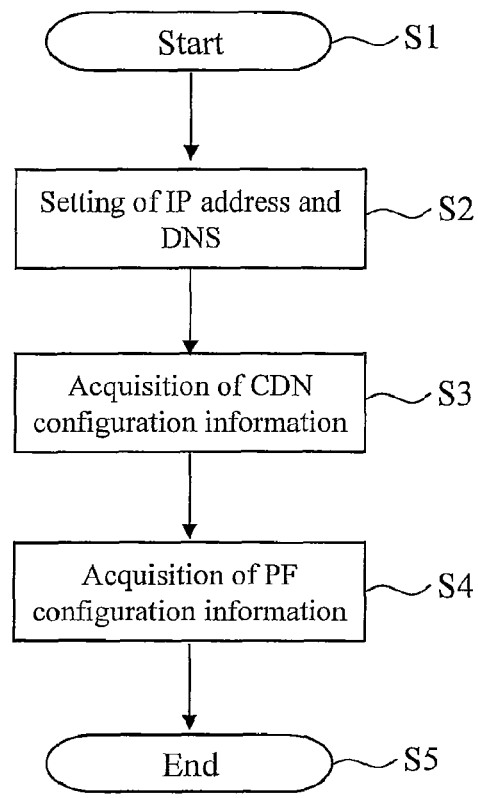
FIG. 2 is a flowchart showing a flow of setting processing concerning IPTV at initial startup.

FIG. 2 is a flowchart showing an example of setting processing concerning IPTV at initial startup. In the digital broadcast receiver A according to this embodiment, setting concerning IPTV (hereinafter, referred to as IPTV setting) is started at initial startup (step S1: Start), then a process to set an IP address and DNS is performed in step S2. Next, in step S3, a process to acquire the CDN configuration information is performed, and a process to acquire the PF configuration information and the like are performed in step S4. The processing is thus terminated (step S5). The digital broadcast receiver is allowed to use a portal service provided by the service provider after the processing is terminated.

In order to actually use the IP broadcast service, it is necessary to acquire the channel information. However, the acquisition of the channel information is not performed at the IPTV setting because 1) basic registration is previously required at the portal site in some cases and 2) IP broadcast services are not provided in some service types.

Figure 3:
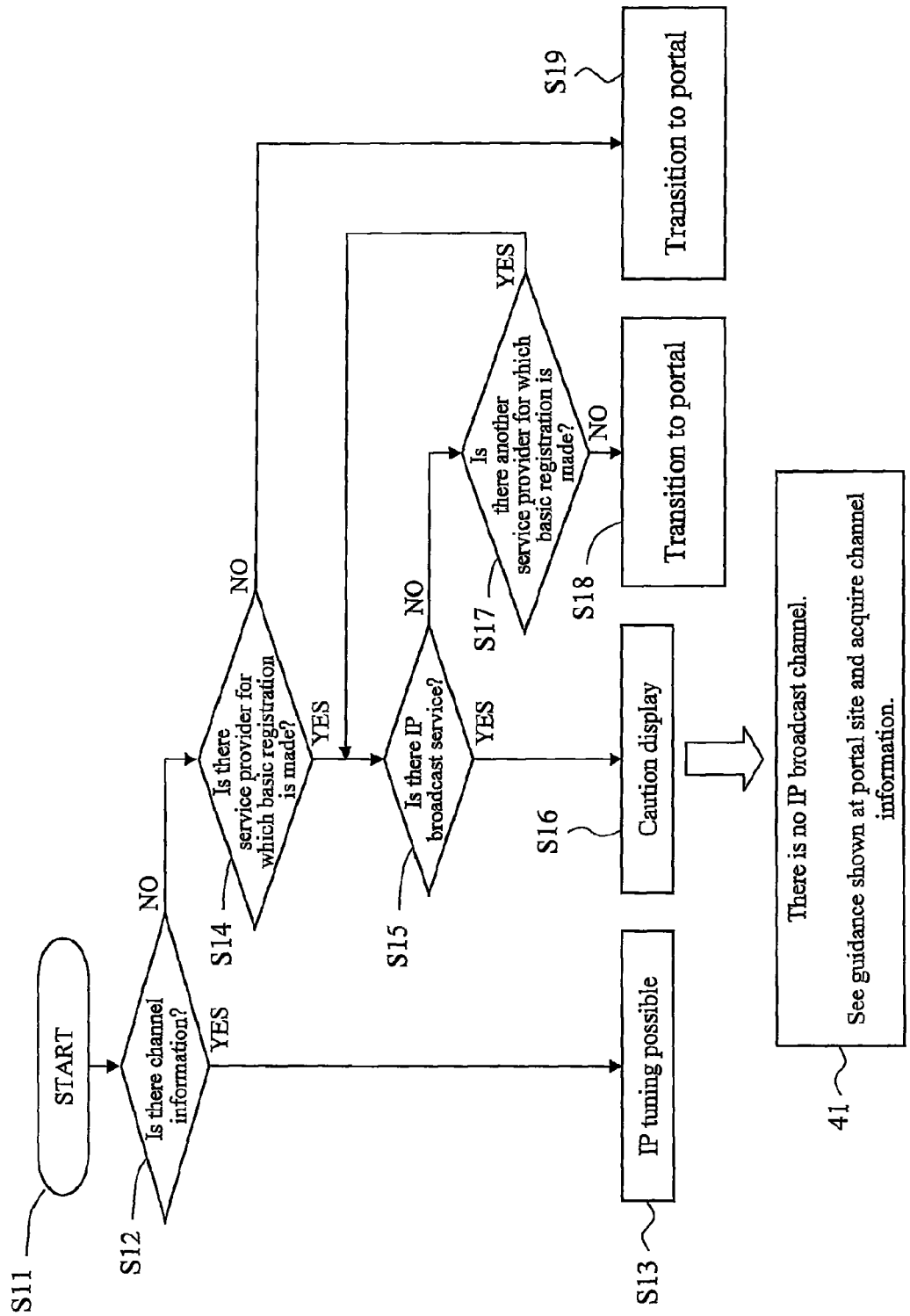
FIG. 3 is a flowchart showing an example of a tuning pattern at the time of selecting IPTV.

FIG. 3 is a flowchart showing an example of a flow of tuning pattern processing at the time of selecting IPTV.

According to the specification of digital broadcast receivers, when a user tries to use the IPTV service (for example, when the user selects the IPTV service by using an input switch, a direct button, or the like), even if the user wants to receive an IP broadcast in a similar manner to digital terrestrial broadcasting or BS digital broadcasting, the digital broadcast receiver A cannot receive the IP broadcast in a state where only the IPTV setting is made since the digital broadcast receiver A has not acquired the channel information of IP broadcasting.

Here, when the IPTV is selected (step S11: start), the digital broadcast receiver A proceeds to a process of step S14 if not having acquired the channel information (NO in step S12). Then it is judged whether there is a service provider for which the basic registration has already been performed (the presence or absence of a service provider).

Meanwhile, if the IPTV service is selected after the channel information is acquired (YES in step S12), the digital broadcast receiver A can tune in IP broadcasting (step S13). In the case where IPTV has been once selected before, the digital broadcast receiver A may be configured to automatically tune in the channel selected last.

If there is no service provider for which the basic registration has already been performed (NO in step S14), the processing proceeds to step S19 to transition to the portal site and prompt the basic registration processing. If there are multiple portal sites, the digital broadcast receiver A may be configured to allow selection on which portal site is to be displayed at setting at the time of initial startup, or otherwise may be configured to select the portal site for which the registration has been made first.

On the other hand, if there is a service provider for which the basic registration has already been performed (YES in step S14), the processing proceeds to step S15 to determine whether there is an IP broadcast service or not. When no IP broadcast service is provided (NO), the processing proceeds to step S17, where it is determined whether there is another service provider for which the basic registration has already been performed. In this determination, if there is no other service provider for which the basic registration has already been performed (NO), the digital broadcast receiver A transitions to a portal site of the service provider for which the basic registration has already been performed. If there are multiple portal sites for which the basic registration has already been performed, the digital broadcast receiver A may be configured to select one of the portal sites for which the registration has been made first.

If it is determined in step S15 that the IP broadcast service is provided (YES), the processing proceeds to step S16, where a caution display is performed. In the caution display, as indicated by reference numeral 41, a display is made to prompt acquisition of the channel information like: "There is no IP broadcast channel. See the guidance shown at the portal site and acquire channel information." This allows the user to surely acquire the channel information.

Figure 4:
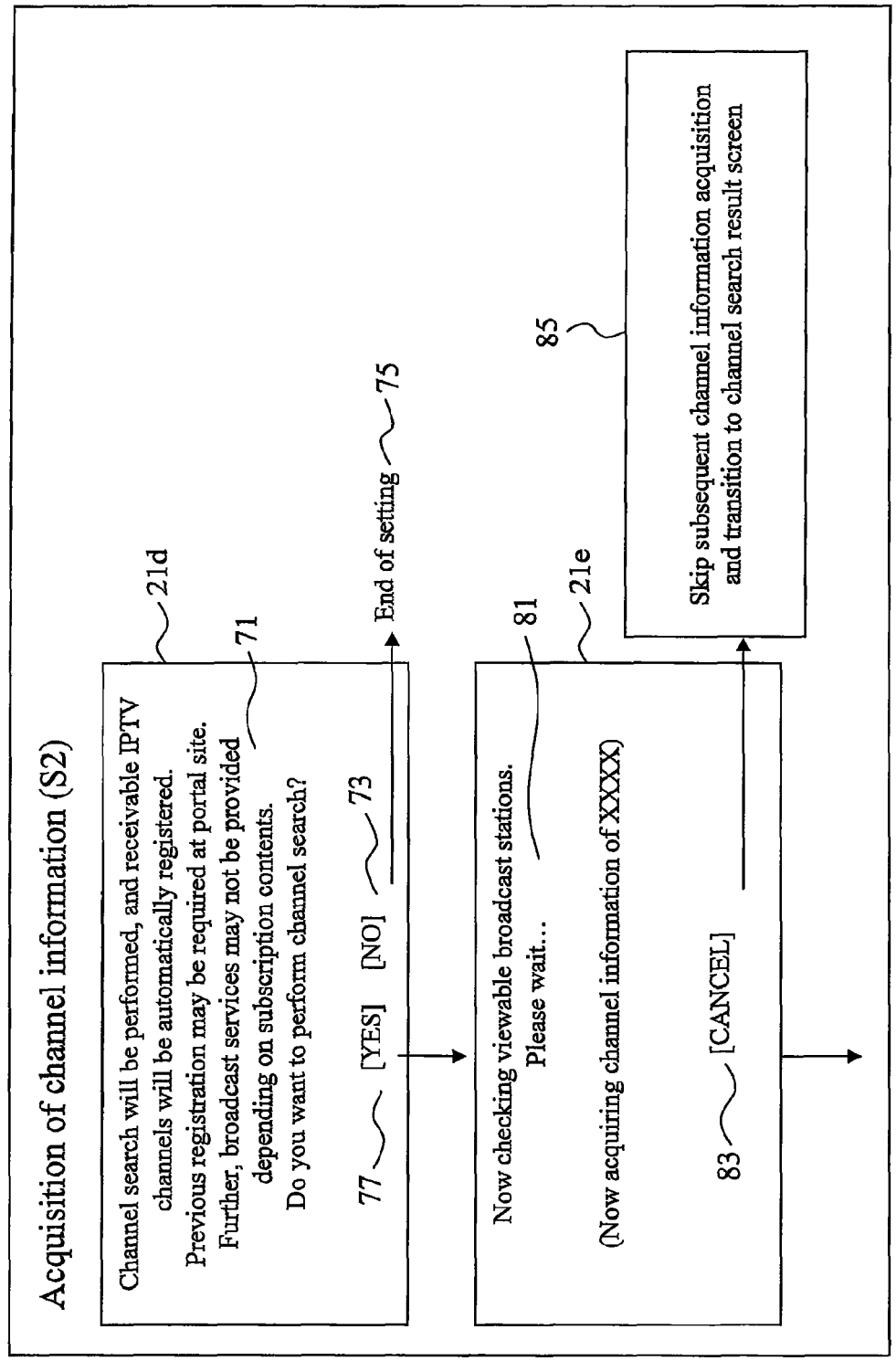
FIG. 4 is a view showing a display screen example concerning acquisition of channel information.
Figure 5:
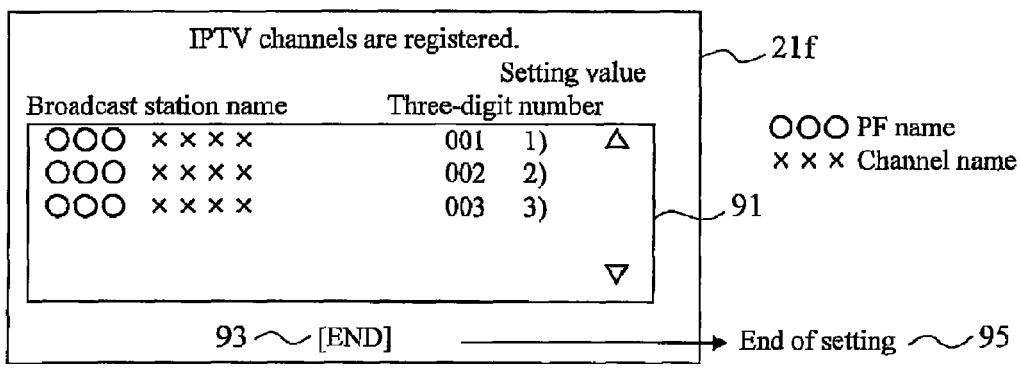
FIG. 5 is a view showing a display screen example concerning acquisition of channel information.
Figure 5:
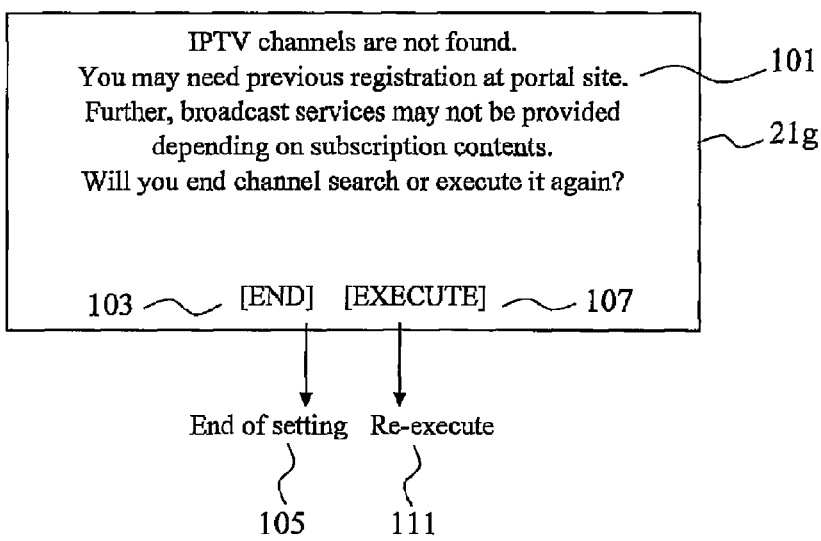

Next, a description will be given of the acquisition of the channel information. FIGS. 4 and 5 are each a view showing a display screen example concerning acquisition of channel information. As shown in FIG. 4, the digital broadcast receiver shows, in a display screen 21d, a display 71 prompting the user to acquire the channel information with a proviso such as: "Channel search will be performed, and receivable IPTV channels will be automatically registered. Previous registration may be required at the portal site. Further, broadcast services may not be provided depending on subscription contents. Do you want to perform channel search?." The digital broadcast receiver A accepts a selected one of YES 77 and NO 73 from the user. If YES 77, the digital broadcast receiver A proceeds to a display screen 21e below, and if NO 73, the digital broadcast receiver A proceeds to end of setting 75.

In the display screen 21e, the digital broadcast receiver A displays an indication 81: "Now checking viewable broadcast stations. Please wait . . . " and an indication for informing the user: "Now acquiring channel information of xxxx" and acquires the channel information, thus proceeding to a process shown in FIG. 5. Here, the digital broadcast receiver A stops to acquire the channel information when "cancel" 83 is pressed, then proceeding to the process shown in FIG. 5 (85). The channel information can be thus acquired at this phase. Next, a description will be given of the detail of the process to acquire the channel information with reference to FIG. 5. When one or more channels are found (FIG. 5(a)), a message of "IPTV channels are registered" is displayed in a display screen 21f, and the channel information including a PF name, a channel name, and a three-digit number as the setting value is set up (stored in the memory). An end button 93 is pressed to finish the setting (95).

If no channel information is found (FIG. 5(b)), as shown in a display screen 21g, the digital broadcast receiver A displays a message indication 101 to the user "IPTV channels are not found. You may need previous registration at the portal site. Further, broadcast services may not be provided depending on subscription contents." The digital broadcast receiver A also displays a message of "Will you end channel search or execute it again?" to prompt the user's selection. If "end" 103 is pressed, the process proceeds to end of setting 105, and if "re-execute" 107 is pressed, a re-execution process 111 is performed.

As described above, when there is no channel information but there is a service provider for which the basic registration has already been performed and the service provider provides an IP broadcast service at the time of selecting IPTV, the digital broadcast receiver A performs a caution display for acquisition of the channel information to cause the user to acquire the channel information under those conditions.

The aforementioned configuration allows the user to smoothly perform setting for receiving IP broadcasts.

As described above, according to this embodiment, when the viewer selects an IP broadcast, the viewer can perform an operation in enormous number of services without any confusion even if the screen after transition is changed depending on whether there are broadcasts viewable through the receiver.

Note that, the receiver according to the present invention does not essentially have to include the function to receive digital broadcasts through an antenna and may be an IPTV-dedicated device.

INDUSTRIAL APPLICABILITY

The present invention is applicable to a digital broadcast receiver capable of receiving an IP broadcast.

The invention claimed is:

1. A digital broadcast receiver, comprising:
a controller configured to perform, at initial startup, control such that, among settings concerning an IPTV function, a process to set an IP address and DNS, a process to acquire CDN configuration information, and a process to acquire PF configuration information are performed at a first timing while a process to require the acquirement of channel information is not performed at the first timing, wherein
the controller performs a caution display requiring user input to approve initiation of acquiring of the channel information when there is a service provider for which basic registration has already been performed at next start-up timing.

2. The digital broadcast receiver according to claim 1, characterized in that even if a service provider for which the basic registration has already been performed exists but does not provide an IP broadcast service; but if there is another service provider for which the basic registration has already been performed, the controller determines whether there is an IP broadcast service again at the next start-up timing.

3. The digital broadcast receiver according to claim 2, characterized in that the controller transitions to a top page of a service when there is no service provider for which the basic registration has already been performed at the next start-up timing.

4. The digital broadcast receiver according to claim 1, characterized in that if a service provider for which the basic registration has already been performed exists but does not provide an IP broadcast service; and
if there is no other service provider for which the basic registration has already been performed, the controller transitions to a portal site set in the basic registration at the next start-up timing.

5. The digital broadcast receiver according to claim 4, characterized in that the controller transitions to a top page of a service when there is no service provider for which the basic registration has already been performed at the next start-up timing.

6. The digital broadcast receiver according to claim 1, characterized in that the controller transitions to a top page of a service when there is no service provider for which the basic registration has already been performed at next start-up timing.

7. The digital broadcast receiver according to claim 1, characterized in that the controller transitions to a top page of a service when there is no service provider for which the basic registration has already been performed at the next start-up timing.

8. A reception method in a digital broadcast receiver capable of receiving an IP broadcast, comprising:

performing, at initial startup,
a process step of setting an IP address and DNS,
a process step of acquiring CDN configuration information,
a process step of acquiring PF configuration information at a first timing, while skipping a process step of requiring the acquirement of channel information at the first timing, among settings concerning an IPTV function, and performing a caution display requiring user input to approve initiation of acquiring of the channel information when there is a service provider for which basic registration has already been performed at next start-up timing.

9. A tangible non-transitory computer-readable recording medium encoded with instructions, wherein the instructions, when executed on a processor, cause the processor to perform a method, comprising:

performing, at initial startup,
a process step of setting an IP address and DNS,
a process step of acquiring CDN configuration information,
a process step of acquiring PF configuration information at a first timing, while skipping a process step of requiring the acquirement of channel information at the first timing, among settings concerning an IPTV function, and performing a caution display requiring user input to approve initiation of acquiring of the channel information when there is a service provider for which basic registration has already been performed at next start-up timing.

* * * * *